(12) United States Patent
Govindankutty et al.

(10) Patent No.: US 12,071,151 B2
(45) Date of Patent: Aug. 27, 2024

(54) APPARATUS AND METHOD FOR USE WITH A VEHICLE

(71) Applicant: JAGUAR LAND ROVER LIMITED, Warwickshire (GB)

(72) Inventors: Anand Govindankutty, Warwickshire (GB); Helio Cardoso, Warwickshire (GB); Fivos Panagiotopoulos, Warwickshire (GB); Nilesh Singh, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 364 days.

(21) Appl. No.: 17/595,134

(22) PCT Filed: May 7, 2020

(86) PCT No.: PCT/EP2020/062655
§ 371 (c)(1),
(2) Date: Nov. 9, 2021

(87) PCT Pub. No.: WO2020/225341
PCT Pub. Date: Nov. 12, 2020

(65) Prior Publication Data
US 2022/0212687 A1 Jul. 7, 2022

(30) Foreign Application Priority Data
May 9, 2019 (GB) ..................................... 1906564

(51) Int. Cl.
*B60W 10/20* (2006.01)
*B60W 10/04* (2006.01)
(Continued)

(52) U.S. Cl.
CPC ............ *B60W 50/12* (2013.01); *B60W 10/04* (2013.01); *B60W 10/20* (2013.01); *G05D 1/0011* (2013.01);
(Continued)

(58) Field of Classification Search
CPC .. G06V 20/588; G06V 20/582; G06V 20/586; G08G 1/09626; G08G 1/09623;
(Continued)

(56) References Cited

U.S. PATENT DOCUMENTS 8,890,717 B2 * 11/2014 McClellan ............ G01S 5/0027
340/936
10,453,107 B2 * 10/2019 Roche .................... G06Q 10/02
(Continued)

FOREIGN PATENT DOCUMENTS

| EP | 1674826 A1 | 6/2006 |
| WO | 2006090562 A1 | 8/2006 |
| WO | 2018068482 A1 | 4/2018 |

OTHER PUBLICATIONS

Sun et al., On-road vehicle detection: a review, 2006, IEEE, p. 694-711 (Year: 2006).*

(Continued)

*Primary Examiner* — McDieunel Marc
(74) *Attorney, Agent, or Firm* — McCoy Russell LLP (57) ABSTRACT

A driver assistance system for a vehicle, includes one or more controllers and is configured to: receive location information indicative of a location of the vehicle; determine, based on image data received from one or more imaging devices associated with the vehicle, one or more visible characteristics in an environment of the vehicle; determine, based at least in part on the location information and the visible characteristics, an availability of a remotely (Continued)

accessible feature of the vehicle; and output a signal indicative of the availability of the remotely accessible feature.

15 Claims, 5 Drawing Sheets

(51) Int. Cl.
  *B60W 50/12* (2012.01)
  *G05D 1/00* (2006.01)
  *G06V 20/56* (2022.01)
  *G06V 20/58* (2022.01)

(52) U.S. Cl.
  CPC .......... *G06V 20/582* (2022.01); *G06V 20/586* (2022.01); *G06V 20/588* (2022.01); *B60W 2420/403* (2013.01); *B60W 2510/22* (2013.01); *B60W 2552/05* (2020.02); *B60W 2552/53* (2020.02); *B60W 2555/20* (2020.02); *B60W 2555/60* (2020.02); *B60W 2556/40* (2020.02)

(58) Field of Classification Search
  CPC ...... B60W 10/20; B60W 50/12; B60W 10/04; B60W 2420/42; B60W 2555/20; B60W 2510/22; B60W 2552/05; B60W 2555/60; B60W 2556/40; B60W 2552/53; G05D 1/0011
  See application file for complete search history.

(56) References Cited

U.S. PATENT DOCUMENTS

| | | | | |
|---|---|---|---|---|
| 11,180,116 | B2* | 11/2021 | Suzuki | B60R 25/305 |
| 11,210,689 | B2* | 12/2021 | Watanabe | G06Q 30/0207 |
| 11,493,348 | B2* | 11/2022 | Levy | B60Q 1/507 |
| 11,543,817 | B2* | 1/2023 | Takechi | H04W 4/33 |
| 11,587,193 | B2* | 2/2023 | Liu | H04W 4/029 |
| 11,709,062 | B2* | 7/2023 | Inoue | G08G 1/0141 |
| | | | | 701/533 |
| 2003/0193390 | A1 | 10/2003 | Muramatsu | |
| 2008/0117079 | A1 | 5/2008 | Hassan | |
| 2011/0130916 | A1* | 6/2011 | Mayer | B60L 3/0023 |
| | | | | 903/903 |
| 2015/0169967 | A1 | 6/2015 | Nakamura et al. | |
| 2018/0334136 | A1 | 11/2018 | Chaston et al. | |
| 2018/0339703 | A1* | 11/2018 | Nix | B60W 10/04 |
| 2019/0251370 | A1 | 8/2019 | Askeland | |
| 2021/0314731 | A1* | 10/2021 | Watkins | H04W 4/029 |

OTHER PUBLICATIONS

Leohold et al., Communication requirements of future driver assistance systems in automobiles, 2004, IEEE, p. 167-174 (Year: 2004).*
Daily et al., WebOn World: Geo-coded Video and Spatial Audio in Vehicles, 2007, IEEE, p. 1-13 (Year: 2007).*
Horgan et al., Vision-Based Driver Assistance Systems: Survey, Taxonomy and Advances, 2015, IEEE, p. 2032-2039 (Year: 2015).*
Great Britain Intellectual Property Office, Combined Search and Examination Report under Sections 17 and 18(3) Issued in Application No. GB1906564.8, Nov. 8, 2019, 6 pages.
ISA European Patent Office, International Search Report and Written Opinion Issued in Application No. PCT/EP2020/062655, Aug. 24, 2020, WIPO, 14 pages.
Great Britain Intellectual Property Office, Combined Search and Examination Report under Sections 17 and 18(4) Issued in Application No. GB2113020.8, Oct. 6, 2021, 3 pages.

* cited by examiner

APPARATUS AND METHOD FOR USE WITH A VEHICLE

CROSS REFERENCE TO RELATED APPLICATIONS

The present application is a U.S. National Phase of International Application No. PCT/EP2020/062655 entitled "APPARATUS AND METHOD FOR USE WITH A VEHICLE," and filed on May 07, 2020. International Application No. PCT/EP2020/062655 claims priority to Great Britain Patent Application No. 1906564.8 filed on May 09, 2019. The entire contents of each of the above-listed applications are hereby incorporated by reference for all purposes.

TECHNICAL FIELD

Aspects of the disclosure relate to a system, to a vehicle, to a method, and to computer software.

BACKGROUND AND SUMMARY

Driver assistance systems are being provided with increasing numbers of features. However, it may be desired to only make such features selectively available. That is, to only make features of driver assistance systems available at certain times. In some embodiments, it may be desired to make remotely accessible features of the driver assistance system available only at certain times. The remotely accessible features may include features which control one or more functions such as steering, acceleration and braking of the vehicle.

It is an object of embodiments of the disclosure to at least mitigate one or more of the problems of the prior art.

According to aspects of the present disclosure, there is provided a driver assistance system, a vehicle, a method and computer software.

According to an aspect of the present disclosure, there is provided a driver assistance system for a vehicle, the system comprising one or more controllers, the driver assistance system configured to receive location information indicative of a location of the vehicle, receive data indicative of one or more visible characteristics in an environment of the vehicle, determine, in dependence on one or more visible characteristics in the environment of the vehicle, determine, in dependence on the location information and the visible characteristics, an availability of a feature of the vehicle, and output a signal indicative of the availability of the remotely accessible feature. The feature of the vehicle is determined to be available in appropriate conditions. The feature may be a remotely available feature. The remotely available feature is only available when appropriate.

According to another aspect of the present disclosure, there is provided a driver assistance system for a vehicle, the system comprising one or more controllers, the driver assistance system configured to receive location information indicative of a location of the vehicle, determine, in dependence on image data received from one or more imaging devices associated with the vehicle, one or more visible characteristics in an environment of the vehicle, determine, in dependence on the location information and the visible characteristics, an availability of a remotely accessible feature of the vehicle and output a signal indicative of the availability of the remotely accessible feature. The remotely accessible feature of the vehicle is determined to be available in appropriate conditions.

The one or more controllers optionally comprise an electrical input for receiving an electrical signal indicative of the location information, an electrical input for receiving an electrical signal indicative of the image data from the one or more imaging devices, an electrical output for outputting an electrical signal indicative of the availability of the remotely accessible feature and one or more electronic processors for operatively executing computer-readable instructions to determine the availability of the remotely accessible feature of the vehicle.

The one or more visible characteristics may comprise roadway demarcation markings in the environment of the vehicle. The availability of the remotely accessible feature is determined in dependence on a presence of the roadway demarcation markings in the environment of the vehicle. The availability may be determined in an absence of the roadway demarcation markings.

The roadway demarcation markings may comprises lane demarcation markings. The remotely accessible feature may be determined to be available in dependence on the presence of lane demarcation markings indicative of the location of the vehicle being a public roadway.

Optionally the one or more visible characteristics comprise parking demarcation markings. The remotely accessible feature may be determined to be available in dependence on the presence of parking demarcation markings indicative of the location of the vehicle being a public parking area.

The parking demarcation markings may comprise markings indicative of one or both of parking bays or no-parking areas.

The visible characteristics may comprise roadway signage. The remotely accessible feature may be determined to be available in dependence on the presence of roadway signage indicative of the location of the vehicle being a public roadway or accessible area.

The one or more visible characteristics comprise roadway demarcation markings in the environment of the vehicle, roadway signage and parking demarcation markings. The availability of the remotely accessible feature is determined in dependence on a presence of the roadway demarcation markings, roadway signage and parking demarcation markings in the environment of the vehicle. The availability may be determined in an absence of the aforementioned features.

The remotely accessible feature of the vehicle is optionally determined to be available when the visible information is indicative of the vehicle being off-road. The remotely accessible feature is only available when off-road. The remotely accessible feature is only available when not in a public location.

The visible information may be indicative of the vehicle being off-road in an absence of roadway demarcation markings in the environment of the vehicle. The remotely accessible feature is only available when not on a public roadway.

The visible information may be indicative of the vehicle being off-road in an absence of roadway signage. The remotely accessible feature is only available when not on a public roadway.

Optionally the determination of the availability of the remotely accessible feature comprises interpreting the roadway signage. The interpreting may be to determine whether the signage is indicative of the vehicle being off-road. An interpreted meaning of the roadway signage may be used to determine whether the remotely accessible feature is available.

The remotely accessible feature of the vehicle may be determined to be available when the location of vehicle is not within a predetermined distance of a road associated with one or more predetermined road classifications. It is ensured that the vehicle is not present on or adjacent to the roadway.

Optionally, determining the availability of the remotely accessible feature of the vehicle comprises determining, with respect to digital map data, whether the location of the vehicle corresponds to an off-road location. The digital map data is conveniently used to determine if the location of the vehicle is off-road.

Optionally, determining the availability of the remotely accessible feature may be performed using only the digital map data i.e. without the visible characteristics. It may only be necessary to use the digital map data to determine the availability.

Determining the availability of the remotely accessible feature of the vehicle optionally comprises determining whether the location of the vehicle corresponds to an off-road location in dependence on the visible characteristics. The visible characteristics may be used if it is not determined that the location of the vehicle corresponds to an off-road location in dependence on the digital map data. The visible characteristic may improve a reliability of the determination of the availability of the remotely accessible feature.

The remotely accessible feature may allow a user to control one or both of an acceleration and a steering of the vehicle via a remote device. A feature controlling the vehicle's acceleration and steering may be controlled in dependence on the determined availability.

Determining the availability of the remotely accessible feature of the vehicle may comprise determining the availability in dependence on the vehicle being subject to one or more external conditions, such as surface conditions or weather conditions. The remotely accessible feature is only determined to be available in appropriate external conditions.

Optionally, determining the availability of the remotely accessible feature of the vehicle comprises determining the availability in dependence on a status of one or more vehicle systems. The systems may relate to a vehicle powertrain or vehicle suspension. The remotely accessible feature is only determined to be available when the status of the one or more vehicle systems is appropriate.

The one or more vehicle systems may one or both of a terrain response system and a suspension system of the vehicle. The status is determined in dependence on the environment of the vehicle.

According to a further aspect of the present disclosure, there is provided a vehicle comprising the system described above.

According to a still further aspect of the present disclosure, there is provided a method of determining an availability of a remotely accessible feature of a vehicle, the method comprising receiving location information indicative of a location of the vehicle, determining, in dependence on image data received from one or more imaging devices associated with the vehicle, one or more visible characteristics in an environment of the vehicle, determining, in dependence on the location information and the visible characteristics, an availability of a remotely accessible feature of the vehicle and outputting a signal indicative of the availability of the remotely accessible feature.

The one or more visible characteristics optionally comprise roadway demarcation markings in the environment of the vehicle.

The one or more visible characteristics optionally comprise parking demarcation markings.

The one or more visible characteristics optionally comprise roadway signage.

According to yet further aspect of the present disclosure, there is provided computer software which, when executed by a computer, is arranged to perform a method as described above. The computer software may be tangibly stored on a computer readable medium.

BRIEF DESCRIPTION OF THE DRAWINGS

Embodiments of the disclosure will now be described by way of example only, with reference to the accompanying figures, in which.

DETAILED DESCRIPTION

Figure 1:
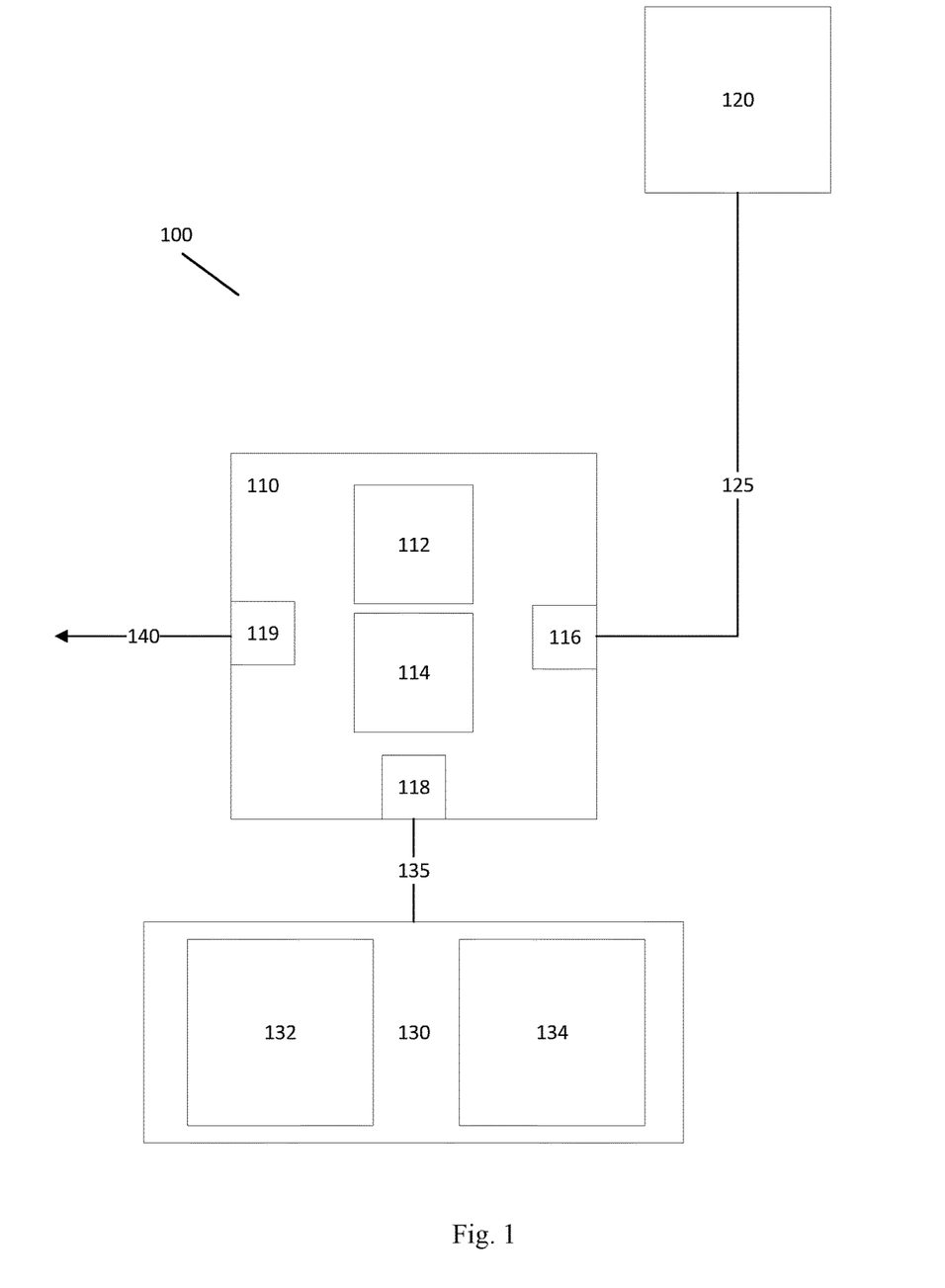
FIG. 1 is a schematic illustration of a driver assistance system for a vehicle according to an embodiment of the disclosure.

FIG. 1 illustrates a driver assistance system (DAS) 100 for a vehicle according to an embodiment of the disclosure. The DAS 100 comprises one or more electrical controllers 110. Each electrical controller may be operative to execute computer-readable instructions to, at least partly, perform a method according to an embodiment of the disclosure. The DAS 100 illustrated in FIG. 1 comprises one controller 110 with it being appreciated that this is merely illustrative.

The controller 110 comprises in some embodiments one or more electronic processors 112. The one or more processors 112 may operatively execute computer-readable instructions which may be stored in a storage device 114 which may be in the form of one or more memory devices 114. The one or more memory devices 114 may store the computer readable instructions therein representing a method according to an embodiment of the disclosure as will be explained. The storage device 114 may also store digital map data which may be used by the processor 112 to determine a location of the vehicle with respect to geographical features identified in the map data. The geographical features may comprise navigable areas such as roads, car parks etc. It will be appreciated that in some embodiments the map data may be provided from a remote computing device and only temporarily stored in the storage device 114 such as in the form of map tiles relating to a geographic location of the vehicle and one or more surrounding areas.

The DAS 100 comprises a location determination means 120. The location determination means 120 may be a location determining device 120 for providing a location signal 125 indicative of a geographic location of the vehicle. The location determination means 120 may be arranged to receive one or more wireless signals to determine the geographic location of the vehicle in dependence thereon. The wireless signals may be one or both of wireless communication signals, such as WiFi or signals from a cellular telecommunications network, and wireless navigation signals such as GPS, GLONASS or Galileo navigation signals. The location signal 125 is provided to an input means 116 of the controller 110. The input means 116 may be an electrical input of the controller 110 for receiving an electrical signal representative of the geographic location of the vehicle.

The DAS 100 comprises an imaging means 130 in the form of an imaging system 130 for providing image data 135 to the DAS 100, such as to an input means 118 of the controller 110. The input means 118 may be an electrical input of the controller 110 for receiving an electrical signal representative of the image data 135. The imaging system comprises one or more imaging devices for generating the image data 135 representative of an environment of the vehicle. Each imaging device may be, for example, a camera.

The imaging system 130 may comprise a plurality of different types of imaging device. In some embodiments, the imaging system 130 comprises a first imaging sub-system 132 and a second imaging sub-system 134. Each sub-system 132, 134 may be arranged to provide image data relating to a specific region of the vehicle or image data from respective, different, types of imaging devices. In one embodiment the first imaging sub-system is a forward imaging system 132 of the vehicle. The forward imaging system 132 may comprise a stereoscopic imaging device for providing image data from which a range of an object may be determined, alternatively the range may be determined by a processor associated with one imaging device where the processor uses a plurality of frames of image data to determine the range of the object, such as from a change in viewing angle of the object in the plurality of frames. The second imaging sub-system 134 is a surround or partial-surround imaging system 134 for providing image data at least from around a portion of the vehicle or from a plurality of different viewpoints distributed around the vehicle.

Figure 2:
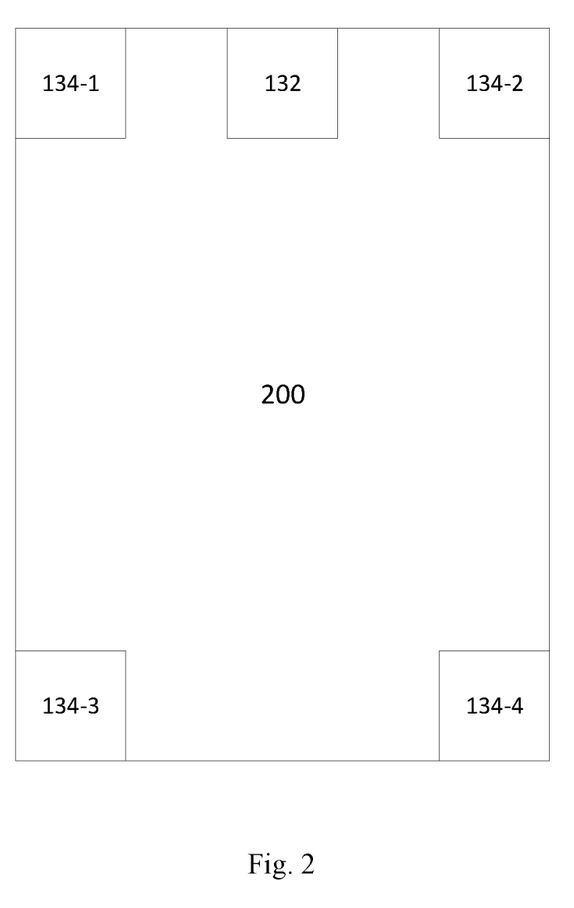
FIG. 2 is a schematic illustration of a vehicle according to an embodiment of the disclosure.

An example second imaging system 134 is illustrated in FIG. 2. FIG. 2 schematically illustrates a vehicle 200 in plan view. The vehicle comprises a plurality of imaging devices 132, 134-1, 134-2, 134-3, 134-4 distributed there-around. Whilst FIG. 2 illustrates five imaging devices 132, 134-1, 134-2, 134-3, 134-4, it will be appreciated that this is merely illustrative and that other numbers of imaging devices may be used. The imaging device 132 is a forward imaging device to view a forward region of the vehicle 200 as described above. Imaging devices 134-1, 134-2, 134-3, 134-4 are distributed around a periphery of the vehicle to provide surround image data of the vehicle 200.

The controller 110 comprises an output means 119 for outputting an availability signal 140 indicative of an availability of a feature of the vehicle. The availability signal 140 may be indicative, in some embodiments, of the availability of a remotely accessible feature of the vehicle. The remotely accessible feature is a feature of the vehicle which is accessible i.e. can be activated and/or deactivated by a user remote from the vehicle, such as by operation of a remote device i.e. a portable or mobile device such as a handheld telecommunications device equipped with appropriate software, or a dedicated portable device with a capability of wirelessly communicating with the vehicle to access or control the remote feature.

The remotely accessible feature may allow a user to control one or both of an acceleration and a steering of the vehicle via the remote device. For example, the user may remotely control or remotely drive the device via the remote device. In the case that the user is able to remotely drive the vehicle it may be desirable for such a feature to only be available in particular circumstances, as will be explained.

The availability signal 140 may be provided to a controller or module of the vehicle responsible for the remotely accessible feature such that the feature is only available in dependence on the availability signal 140.

Figure 3:
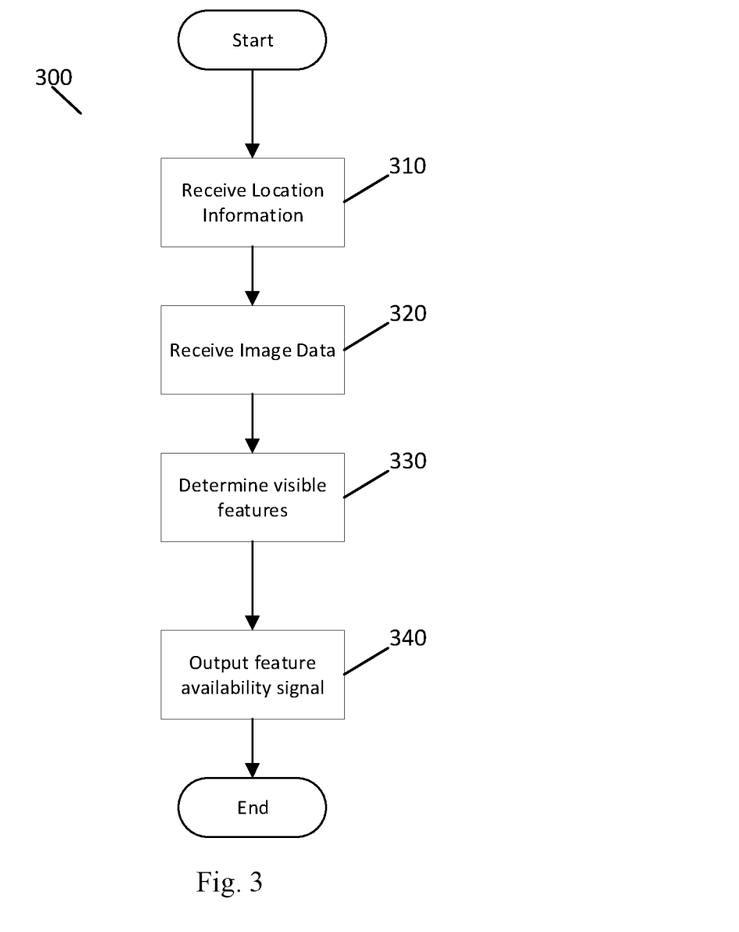
FIG. 3 shows a method according to an embodiment of the disclosure.

FIG. 3 illustrates a method 300 according to an embodiment of the disclosure. The method 300 is a method of determining an availability of a feature of a vehicle, such as the vehicle 200. The feature may be a remotely accessible of the vehicle 200. The method 300 may be performed by a driver assistance system such as the system 100 illustrated in FIGS. 1 and 2 and described above. For example, an embodiment of the method 300 may be represented by computer-readable instructions stored in the storage device 114 and performed by the processor 112 of the controller 110.

The method 300 comprises a step 310 of receiving the location signal 125 providing location information or data 125 indicative of the location of the vehicle 200. The location signal 125 may be received at the input 116 of the controller 110. Step 310 may comprise the location determining device 120 receiving wireless signals and determining the geographic location of the vehicle in dependence thereon. For example, the location determining device 120 may receive GPS signals and decoding said signals to determine the geographic location of the vehicle 200 such as in the form of a longitude and latitude of the vehicle 200. The location determining device 120 may also receive, for example, WiFi signals which may be used to determine the location of the vehicle in conjunction with data indicative of the identities and geographic locations of WiFi hotspots, with it being appreciated that signals of other communication protocols and communication technologies may be used. The location signal is output by the location determining device 120 to the controller 100.

The method comprises a step 320 of receiving image data 135. The image data 135 is provided by the imaging system 130 as described above. The image data 135 is received at the input 118 of the controller 110.

The method comprises a step 330 of determining one or more visible characteristics in an environment of the vehicle 200. The visible characteristics in the environment of the vehicle 200 may be determined in dependence on the image data 135 received from the one or more imaging devices 132, 134 associated with the vehicle 200.

The visible characteristics may comprise roadway demarcation markings. By roadway demarcation markings it is meant features of a surface providing an indication to users of the roadway. By roadway it is meant any region intended to be used by vehicles including, but not restricted to, roads, car parks, and other vehicle-navigable areas. The roadway demarcation information may comprise lane demarcation markings indicative of one or more driving lanes of the roadway. The roadway demarcation markings may be linear markings at a side of a roadway or dividing adjacent lanes such as dividing lanes for driving in opposed or parallel directions. The one or more visible characteristics may comprise parking demarcation markings indicative of one or both of no parking areas or locations intended for vehicle parking. The demarcation markings for a no parking area may comprise, for example, hatching or striped markings indicating the areas not intended for vehicle parking. The parking demarcation markings indicative of vehicle parking may be markings indicative of parking bays for vehicles.

The visible characteristics may comprise roadway signage. By roadway signage it is meant signage intended to be visible to occupants of a vehicle to visually provide information to those occupants, such as a driver of the vehicle. The signage may provide information associated with a roadway, such as speed limit or other information, direction or navigation signs or signs providing other information to vehicle occupants.

Step 330 comprises the one or more visible characteristics in the environment of the vehicle 200 being identified which may be performed by the processor 120 executing one or more image recognition algorithms to detect the visible characteristics, such as surface markings e.g. lines, hatching etc, and signage in the image data 135 provided from the imaging system 130. In some embodiments, the roadway signage may be interpreted, for example by comparing symbols against a library of symbols and determining a meaning of any text present on the sign. The interpretation allows the meaning of the sign to be utilized in determining the availability i.e. to determine whether the vehicle is in a public location or off-road The method 300 comprises a step 340 of outputting the availability signal 140 indicative of the availability of the feature of the vehicle. The outputting of the availability signal may be performed in dependence on the one or more visible characteristics identified in step 340. For example, the availability signal may be output in dependence on one or more of the determined geographic location of the vehicle 200, and/or the presence of one or more of roadway demarcation markings, roadway signage and parking demarcation markings in the environment of the vehicle 200. In some embodiments, the controller 110 is arranged to output the availability signal 140 in dependence of the location of the vehicle 200 not corresponding to a location intended for public vehicular navigation, such as a road, and the absence of one or more of roadway demarcation markings, roadway signage and parking demarcation markings in the environment of the vehicle 200, these being indicative of the vehicle 200 being in a non-public or private location or a location where it is not intended for public to access, such as a driveway, field etc. Thus it can be appreciated that step 340 comprises a process of determining whether to output the availability signal 140. The determination may be made in dependence on one or both of the geographic location of the vehicle and the visible characteristics of the environment of the vehicle 200, as will be explained.

Figure 4:
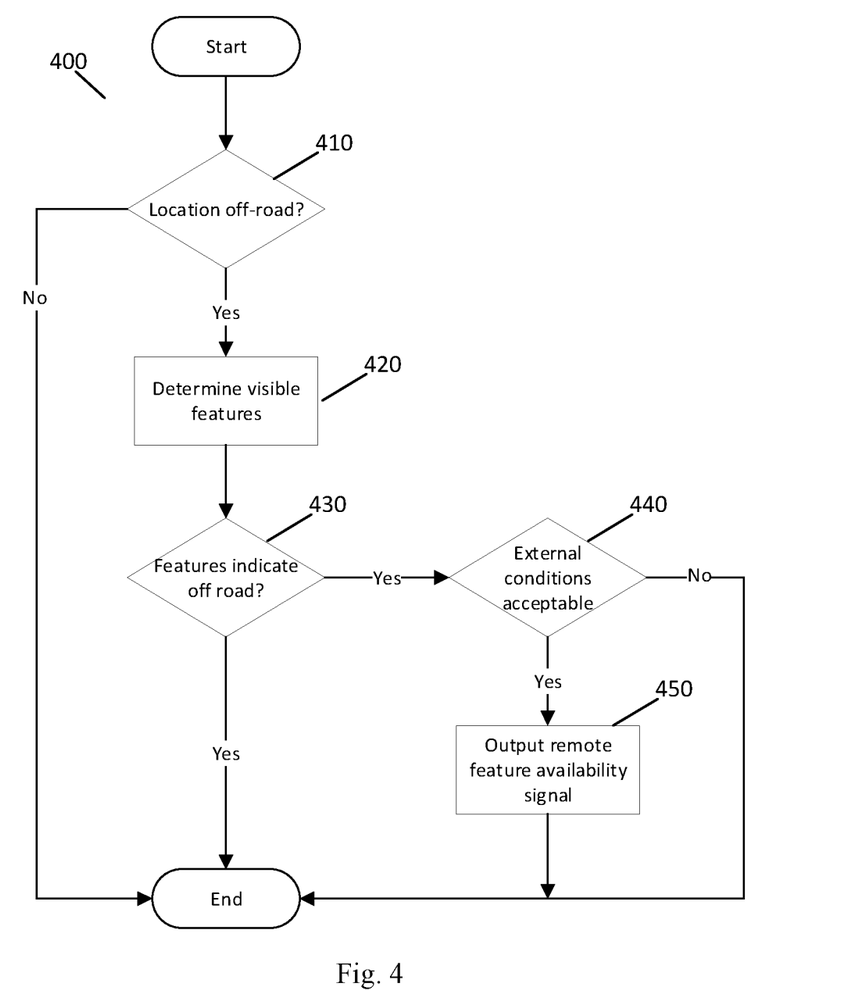
FIG. 4 shows a method according to another embodiment of the disclosure.

FIG. 4 illustrates a further method 400 according to an embodiment of the disclosure. The method 340 is another method of determining an availability of a feature of a vehicle, such as the vehicle 200. The feature may be a remotely accessible of the vehicle 200. The method 400 may be performed by a driver assistance system such as the system 100 illustrated in FIGS. 1 and 2 and described above. For instance, an embodiment of the method 400 may be represented by computer-readable instructions stored in the storage device 114 and performed by the processor 112 of the controller 110.

The method 400 may be performed as part of step 340 of the method 300 illustrated in FIG. 3 and described above. For example, the method 400 performs the determination of whether to output the availability signal 140 according to some embodiments of the disclosure.

In step 410 of the method 400 the location of the vehicle 200 is compared against the digital map data to determine whether the location of the vehicle 200 corresponds to an off-road location. By off-road location, it is meant that the location of the vehicle does not correspond to on, or in some embodiments, within a predetermined distance of a location corresponding to a roadway, such as 5 m, 10 m or 25 m although other distances can be utilised. In some embodiments, the location of the vehicle 200 is compared against the map data to determine whether the location of vehicle does not correspond to, or is not within a predetermined distance of, a road associated with one or more predetermined road classifications. The one or more predetermined road classifications may correspond to those of public roads i.e. so that the vehicle may be present on a road having a classification associated with a private road or driveway.

It will be appreciated that it is not necessary for the vehicle to be on an unpaved or un-metalled surface to be considered off-road. Step 410 may also compare the location of the other vehicle against other types of location defined in the map data which correspond to publicly accessible locations, such as car parks etc. In some embodiments, although not illustrated in FIG. 2, the availability signal 140 may be output in dependence only on the location of the vehicle 200 being determined to be off-road.

In the illustrated embodiment, if the location of the vehicle 200 is determined in step 410 to correspond to an off-road location, then the method moves to step 420. However if the location of the vehicle 200 is determined to correspond to a roadway or other publicly accessible area in step 410 the method may end i.e. the availability signal 140 is not output, such that the feature of the vehicle 200 Is not available.

In step 430 it is determined whether the vehicle is off-road in dependence on the one or more visible characteristics identified in step 340 of the method 300. In some embodiments, it is determined in step 430 whether one or more of roadway demarcation markings, roadway signage and parking demarcation markings are present in the environment of the vehicle 200 using image data 135.

In some embodiments of step 430 it is determined, in dependence on the image data, whether the environment of the vehicle 200 is absent of visual indications of the vehicle 200 being in a publicly accessible location. Said determination may be performed by the environment being absent two or more, or all of, roadway demarcation markings, roadway signage and parking demarcation markings. The absence of at least two and in some embodiments all three of these features provides increased confidence of the vehicle 200 being in a non-public location i.e. off-road. In some embodiments, the availability signal 140 may be output when it is determined that the environment of the vehicle 200 is absent of visual indications of the vehicle 200 being in a publicly accessible location. However, as illustrated in FIG. 4, the illustrated embodiment of the method 400 moves to step 440 where a further determination is made in dependence on one or more external conditions.

In step 440, in some embodiments of the method 400, it is determined whether the availability signal 140 is output in dependence on the one or more external conditions. The one or more external conditions comprise one or both of a condition of a surface on which the vehicle 200 is currently, or has recently in case the vehicle is stationary, driving. The one or more external conditions may relate to one or more of a level of grip and a level of undulation of the surface. The level of grip may be determined by a level of slippage (wheelspin) of one or more of the vehicle's wheels. In some embodiments, the vehicle 200 comprises a terrain response (TR) system which operatively determines a coefficient of grip of the surface and adapts one or more aspects of the vehicle's powertrain to the surface, such as a traction control system of the vehicle. If the surface is determined to be a low-grip surface i.e. having a coefficient of grip less than a predetermined level, then the availability signal 140 may be determined not to be available, thus inhibiting the remote feature. Similarly, the undulation of the surface may be determined with respect to a suspension system of the vehicle 200 i.e. measuring an axle articulation or amount of movement exhibited by the suspension system of the vehicle to provide an indication of the undulation of the surface.

In some embodiments, the one or more external conditions may include weather conditions. For example, the availability signal may only be determined to be available in step 440 if the vehicle 200 is subject to good weather. Good weather may include an absence of rain, ice (above a predetermined temperature) etc. If the determination is positive in step 440 i.e. that the availability signal is to be output, the method moves to step 450 where the availability signal 140 is output.

The availability signal 140 is output by the output means 119 of the controller 110. The availability signal 140 may be output onto a communication bus of the vehicle 200 for receipt by other systems of the vehicle. In response to receiving a request from the user, such as via a remote device wirelessly communicating with the vehicle 200, to access the remote feature when the availability signal 140 is indicative of the feature being available, the remote feature may be provided. The feature may allow the user to remotely drive the vehicle i.e. by controlling one or more of acceleration or movement of the vehicle and steering of the vehicle 200.

Figure 5:
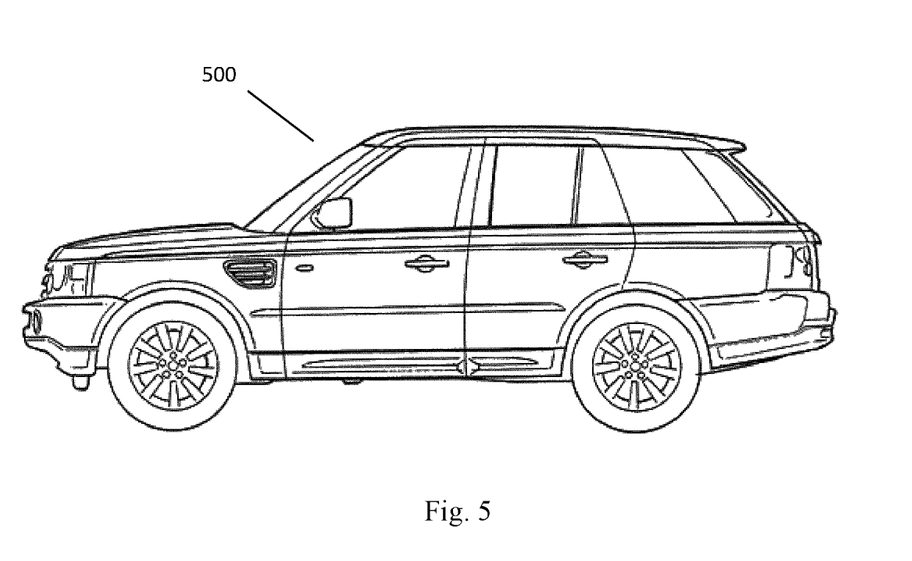
FIG. 5 illustrates a vehicle according to an embodiment of the disclosure.

FIG. 5 illustrates a vehicle 500 according to an embodiment of the disclosure. The vehicle 500 may comprise a system according to an embodiment of the disclosure, such as the system 100 illustrated in FIG. 1. The vehicle 500 may perform a method according to an embodiment of the disclosure such as illustrated in FIGS. 1 and 2. The vehicle 500 is a land-going wheeled vehicle 500 which may be powered by one or both of an internal combustion engine and one or more electric machines.

It can be appreciated that embodiments of the present disclosure determine an availability of a feature of a vehicle to only make the feature available in appropriate circumstances.

It will be appreciated that embodiments of the present disclosure can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present disclosure. Accordingly, some embodiments provide a program comprising code for implementing a system or method as described herein and a machine readable storage storing such a program. Still further, embodiments of the present disclosure may be conveyed electronically via any medium such as a communication signal carried over a wired or wireless connection and embodiments suitably encompass the same.

All of the features disclosed in this specification, and/or all of the steps of any method or process so disclosed, may be combined in any combination, except combinations where at least some of such features and/or steps are mutually exclusive.

Each feature disclosed in this specification, may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of any foregoing embodiments. The disclosure extends to any novel one, or any novel combination, of the features disclosed in this specification, or to any novel one, or any novel combination, of the steps of any method or process so disclosed. The claims should not be construed to cover merely the foregoing embodiments, but also any embodiments which fall within the scope of the claims.

The invention claimed is:

1. A driver assistance system for a vehicle, the driver assistance system comprising one or more controllers, the driver assistance system configured to:
   receive location information indicative of a location of the vehicle;
   determine, based at least in part on image data received from one or more imaging devices associated with the vehicle, one or more visible characteristics in an environment of the vehicle;
   determine, based at least in part on the location information and the one or more visible characteristics, an availability of a remotely accessible feature of the vehicle; and
   output a signal indicative of the availability of the remotely accessible feature, wherein the one or more visible characteristics comprise one or more of:
   roadway demarcation markings in the environment of the vehicle;
   roadway signage; and
   parking demarcation markings.

2. The driver assistance system of claim 1, wherein the remotely accessible feature of the vehicle is determined to be available when the one or more visible characteristics are indicative of the vehicle being off-road.

3. The driver assistance system of claim 2, wherein the one or more visible characteristics comprise roadway demarcation markings in the environment of the vehicle, and the one or more visible characteristics are indicative of the vehicle being off-road in an absence of roadway demarcation markings in the environment of the vehicle and/or in an absence of roadway signage.

4. The driver assistance system of claim 2, wherein the visible characteristics comprise roadway signage and a determination of the availability of the remotely accessible feature comprises interpreting the roadway signage to determine whether the roadway signage is indicative of the vehicle being off-road.

5. A driver assistance system-for a vehicle, the driver assistance system comprising one or more controllers, the driver assistance system configured to:
   receive location information indicative of a location of the vehicle;
   determine, based at least in part on image data received from one or more imaging devices associated with the vehicle, one or more visible characteristics in an environment of the vehicle;
   determine, based at least in part on the location information and the one or more visible characteristics, an availability of a remotely accessible feature of the vehicle; and
   output a signal indicative of the availability of the remotely accessible feature, wherein the remotely accessible feature of the vehicle is determined to be available when the location of vehicle is not within a predetermined distance of a road associated with one or more predetermined road classifications.

6. The driver assistance system of claim 1, wherein determining the availability of the remotely accessible feature of the vehicle comprises determining, with respect to digital map data, whether the location of the vehicle corresponds to an off-road location.

7. The driver assistance system of claim 6, wherein determining the availability of the remotely accessible feature of the vehicle comprises determining whether the location of the vehicle corresponds to an off-road location based at least in part on the one or more visible characteristics based on a determination that the location of the vehicle corresponds to an off-road location based at least in part on the digital map data.

8. The driver assistance system of claim 1, wherein the remotely accessible feature allows a user to control one or both of an acceleration and a steering of the vehicle via a remote device.

9. The driver assistance system of claim 1, wherein the determining the availability of the remotely accessible feature of the vehicle comprises determining the availability based at least in part on the vehicle being subject to one or more weather conditions and/or a status of one or more vehicle systems.

10. The driver assistance system of claim 9, wherein the one or more vehicle systems comprise one or both of a terrain response system and a suspension system of the vehicle.

11. The driver assistance system of claim 1 comprised in a vehicle.

12. The driver assistance system of claim 1, wherein the roadway demarcation markings comprise lane demarcation markings.

13. The driver assistance system of claim 1, wherein the parking demarcation markings comprise markings indicative of one or both of parking bays and no-parking areas.

14. A method of determining an availability of a remotely accessible feature of a vehicle, the method comprising:
  receiving, by a processor, location information indicative of a location of the vehicle;
  determining, by the processor, based at least in part on image data received from one or more imaging devices associated with the vehicle, one or more visible characteristics in an environment of the vehicle;
  determining, by the processor, based at least in part on the location information and the one or more visible characteristics, the availability of the remotely accessible feature of the vehicle; and
  outputting a signal indicative of the availability of the remotely accessible feature, wherein the one or more visible characteristics comprise one or more of:
    roadway demarcation markings in the environment of the vehicle;
    roadway signage; and
    parking demarcation markings.

15. A non-transitory, computer-readable storage medium storing instructions thereon that, when executed by one or more electronic processors, cause the one or more processors to perform the method according to claim 14.

* * * * *